(12) United States Patent
Song et al.

(10) Patent No.: US 11,342,774 B2
(45) Date of Patent: May 24, 2022

(54) POWER CONVERSION CIRCUIT, AND CHARGING APPARATUS AND SYSTEM

(71) Applicant: HUAWEI TECHNOLOGIES CO., LTD., Guangdong (CN)

(72) Inventors: Jun Song, Xi'an (CN); Pengfei Wang, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 190 days.

(21) Appl. No.: 16/721,651

(22) Filed: Dec. 19, 2019

(65) Prior Publication Data

US 2020/0127484 A1  Apr. 23, 2020

Related U.S. Application Data

(63) Continuation of application No. PCT/CN2018/091665, filed on Jun. 15, 2018.

(30) Foreign Application Priority Data

Jun. 19, 2017 (CN) .......................... 201710465881.8

(51) Int. Cl.
*H02J 7/00* (2006.01)
(52) U.S. Cl.
CPC ...... *H02J 7/00714* (2020.01); *H02J 7/00036* (2020.01); *H02J 7/00047* (2020.01); *H02J 2207/20* (2020.01); *H02J 2207/30* (2020.01)
(58) Field of Classification Search
USPC ................................................ 320/161–163
See application file for complete search history.

(56) References Cited

U.S. PATENT DOCUMENTS

| 5,453,643 A | * | 9/1995 | Yang | H02M 7/483 307/71 |
|---|---|---|---|---|
| 6,304,068 B1 | * | 10/2001 | Hui | H02M 3/07 323/288 |
| 2002/0030473 A1 | | 3/2002 | Utsunomiya | |
| 2007/0273430 A1 | | 11/2007 | Akashi et al. | |
| 2009/0230934 A1 | | 9/2009 | Hooijschuur et al. | |
| 2009/0256529 A1 | * | 10/2009 | Wang | H02J 7/0031 320/163 |

(Continued)

FOREIGN PATENT DOCUMENTS

| CN | 101083431 A | 12/2007 |
|---|---|---|
| CN | 201369577 Y | 12/2009 |

(Continued)

*Primary Examiner* — Samuel Berhanu
(74) *Attorney, Agent, or Firm* — James Anderson Harrison

(57) ABSTRACT

The invention provides a charging circuit, comprising a power conversion circuit, and an information collection and signal control circuit. The power conversion circuit is coupled to a voltage source and configured to provide a charging current to a battery. The power conversion circuit comprises a plurality of switch elements, and at least two storage elements, the at least two storage elements are selectively coupled to the voltage source and the output port through the plurality of switch elements. The information collection and signal control circuit is configured to collect information from the voltage source and battery, and control the plurality of switch elements to have the power conversion circuit work under different charging modes.

9 Claims, 6 Drawing Sheets

(56) References Cited

U.S. PATENT DOCUMENTS

| | | | |
|---|---|---|---|
| 2011/0241620 A1* | 10/2011 | Lin | H02J 7/0018 |
| | | | 320/112 |
| 2013/0249219 A1* | 9/2013 | Kim | F02N 11/0866 |
| | | | 290/36 R |
| 2014/0306648 A1 | 10/2014 | Le et al. | |
| 2016/0190921 A1 | 6/2016 | Kumar et al. | |
| 2017/0187332 A1 | 6/2017 | Youn et al. | |
| 2017/0201107 A1 | 7/2017 | Yang et al. | |
| 2018/0041060 A1 | 2/2018 | Walley et al. | |
| 2019/0372462 A1 | 12/2019 | Song et al. | |

FOREIGN PATENT DOCUMENTS

| | | |
|---|---|---|
| CN | 105556820 A | 5/2016 |
| CN | 205544410 U | 8/2016 |
| CN | 205945143 U | 2/2017 |
| CN | 106532831 A | 3/2017 |
| CN | 106549464 A | 3/2017 |
| CN | 106549564 A | 3/2017 |
| CN | 106685219 A | 5/2017 |
| CN | 106787055 A | 5/2017 |
| WO | 2009017783 A1 | 2/2009 |
| WO | 2015096743 A1 | 7/2015 |

\* cited by examiner

POWER CONVERSION CIRCUIT, AND CHARGING APPARATUS AND SYSTEM

CROSS-REFERENCE TO RELATED APPLICATIONS

This application is a continuation of and claims priority to International Application No. PCT/CN2018/091665, filed on Jun. 15, 2018, which claims priority to Chinese Patent Application No. 201710465881.8, filed on Jun. 19, 2017. The disclosures of the aforementioned applications are hereby incorporated by reference in their entireties.

TECHNICAL FIELD

This application relates to the field of circuits, and more specifically, to power conversion circuits and more specifically, to a charging apparatus and system.

BACKGROUND

For a long time, batteries have always been used as power supplies for mobile electronics. A battery provides energy, in a form of a voltage or a current, that allows a circuit to operate. However, energy stored in a battery is limited, and when an electronic apparatus is in use, the battery loses electric power. When an energy supply of the battery is exhausted, a voltage of the battery starts to decrease from a rated voltage of the battery, and the electronic apparatus that obtains electric power depending on the battery is not suitable for continuing operating. To enable the battery to be full of energy again, a battery charging system in a specific form is required.

Usually, a battery charging system includes a power adapter and a charging apparatus. Energy and information are usually transferred between the power adapter and the charging apparatus through a USB cable. A purpose of the power adapter is to transfer energy of a utility power supply to the charging apparatus in a specific voltage manner. A purpose of the charging apparatus is to perform voltage transformation on energy obtained by using the power adapter and then transfer energy to the battery.

Currently, an existing battery charging system supports only one voltage mode. However, different batteries support different charging currents. When charging is limited, if an excessively large current is supplied to a battery, the battery may be damaged or even explode; or if an excessively small current is supplied to a battery, a charging process may be inefficient or completely ineffective.

SUMMARY

This application provides a power conversion circuit, and a charging apparatus and system, to support a plurality of charging modes and effectively increase a battery charging rate.

According to a first aspect, a power conversion circuit is provided, where the power conversion circuit includes: a first switch element, a second switch element, a third switch element, a fourth switch element, a fifth switch element, a sixth switch element, a first energy storage element, and a second energy storage element. In the power conversion circuit, a first end of the first switch element is coupled and connected to an input power supply through a first external connection end of the power conversion circuit, a second end of the first switch element is separately coupled to a first end of the first energy storage element and a first end of the second switch element, a second end of the first energy storage element is separately coupled to a first end of the third switch element and a first end of the fourth switch element, a second end of the second switch element is coupled and connected to a battery through a second external connection end of the power conversion circuit, a second end of the fourth switch element is coupled to the second external connection end, a second end of the third switch element is grounded, a first end of the fifth switch element is coupled to the first external connection end, a second end of the fifth switch element is separately coupled to a first end of the second energy storage element and a first end of the sixth switch element, a second end of the second energy storage element is coupled to the second external connection end, and a second end of the sixth switch element is grounded.

The power conversion circuit can support a plurality of different charging modes, so that the battery can be more quickly charged, thereby effectively improving charging efficiency.

According to a second aspect, a charging apparatus is provided, where the charging apparatus includes the power conversion circuit in the foregoing aspect, an input/output port, and an information collection and signal control circuit coupled to the power conversion circuit, and the information collection and signal control circuit is coupled and connected to the input/output port.

In a possible implementation of the second aspect, the information collection and signal control circuit includes: a digital core processing element, a battery information detection element, an output drive element, an information input element, a first power conversion element, and a second power conversion element. In the information collection and signal control circuit, the information input element, the first power conversion element, and the second power conversion element are separately coupled and connected to the input power supply through a first external connection end of the information collection and signal control circuit; the information input element is connected to the digital core processing element; the first power conversion element is connected to the digital core processing element; the second power conversion element is connected to the output drive element; the digital core processing element is coupled and connected to a data line of a power adapter through a second external connection end of the information collection and signal control circuit; the digital core processing element is connected to the battery information detection element; the battery information detection element is coupled and connected to a battery through a third external connection end of the information collection and signal control circuit; the digital core processing element is connected to the output drive element; and the output drive element is separately coupled to each switch element in the power conversion circuit through a fourth external connection end of the information collection and signal control circuit.

In another possible implementation of the second aspect, a first end of the input/output port is connected to the input power supply of the power adapter, a second end of the input/output port is separately coupled to the first external connection end of the power conversion circuit and the first external connection end of the information collection and signal control circuit, a third end of the input/output port is connected to the data line of the power adapter, and a fourth end of the input/output port is coupled to the second external connection end of the information collection and signal control circuit. Optionally, the input/output port is a USB port.

According to a third aspect, a charging system is provided, where the charging system includes the charging apparatus in the foregoing aspect and implementations, and a power adapter and a battery element that are coupled to the charging apparatus. The charging apparatus and the battery element may be disposed in one device, and the device may be a terminal, a base station, or an electric vehicle.

According to a fourth aspect, a battery charging method is provided. The method is performed in the power conversion circuit according to the foregoing aspect. Based on a composition structure of the power conversion circuit, the power conversion circuit may charge a battery based on a first charging mode, and the method includes: keeping the fifth switch element and the sixth switch element open, where in a first time period, the first switch element and the fourth switch element are in a closed state, the second switch element and the third switch element are in an open state, and the first energy storage element is charged; and in a second time period after the first time period, the first switch element and the fourth switch element are in an open state, the second switch element and the third switch element are in a closed state, and the first energy storage element is discharged.

Alternatively, the power conversion circuit may charge the battery based on a second charging mode, and the method includes: keeping the fourth switch element, the fifth switch element, and the sixth switch element open, and keeping the first switch element and the third switch element closed, where in a first time period, the second switch element is in a closed state, and the battery is directly charged; and in a second time period after the first time period, the second switch element is in an open state, and charging of the battery is suspended.

Alternatively, the power conversion circuit may charge the battery based on a third charging mode, and the method includes: keeping the first switch element, the second switch element, the third switch element, and the fourth switch element open, where in a first time period, the fifth switch element is in a closed state, the sixth switch element is in an open state, and the second energy storage element is charged; and in a second time period after the first time period, the fifth switch element is in an open state, the sixth switch element is in a closed state, and the first energy storage element is discharged.

According to a fifth aspect, a battery charging method is further provided. The method is performed in the charging apparatus according to the foregoing aspect and implementations, and the method includes: obtaining, by the charging apparatus, an input power supply through a connection to a power adapter; collecting, through a connection to a battery, a charging current value supported by the battery, where the charging current value is greater than or equal to a preset current threshold, for example, the current threshold is set to 2 A, 2.5 A, or 3 A; determining, by the charging apparatus, that the power adapter supports a first charging mode; and then keeping, based on the first charging mode, the fifth switch element and the sixth switch element open; in a first time period, closing the first switch element and the fourth switch element, and opening the second switch element and the third switch element, so that the first energy storage element is charged by using the input power supply; and in a second time period after the first time period, opening the first switch element and the fourth switch element, and closing the second switch element and the third switch element, so that the first energy storage element is discharged to charge the battery. In the method, a voltage of the input power supply of the charging apparatus approaches twice a voltage of battery, a charging current is relatively large, and the battery is likely to be fully charged with electricity fast, thereby effectively increasing a battery charging rate.

According to a sixth aspect, a battery charging method is further provided. The method is performed in the charging apparatus according to the foregoing aspect and implementations, and the method includes: obtaining, by the charging apparatus, an input power supply through a connection to a power adapter; collecting, by the charging apparatus through a connection to a battery, a charging current value supported by the battery, where the charging current value is not less than a preset first current threshold and not greater than a preset second current threshold, and the first current threshold is less than the second current threshold, for example, the first current threshold is set to 2 A, 2.5 A, or 3 A, and the second current threshold is set to 5 A; determining, by the charging apparatus, that the power adapter supports a second charging mode; and then keeping, based on the second charging mode, the fourth switch element, the fifth switch element, and the sixth switch element open, and keeping the first switch element and the third switch element closed; in a first time period, closing the second switch element, so that the battery is directly charged by using the input power supply; and in a second time period after the first time period, opening the second switch element, to suspend charging of the battery. In the method, the charging apparatus directly charges the battery with power energy, circuit impedance is relatively small, an energy loss is relatively low, and a charging current is relatively large, so that an overall energy loss is relatively low when the charging apparatus charges the battery, and the battery is likely to be fully charged with electricity fast, thereby effectively increasing a battery charging rate.

According to a seventh aspect, a battery charging method is further provided. The method is performed in the charging apparatus according to the foregoing aspect and implementations, and the method includes: obtaining, by the charging apparatus, an input power supply through a connection to a power adapter; collecting, through a connection to a battery, a charging current value supported by the battery, where the charging current value is less than a preset current threshold, for example, the current threshold is set to 2 A, 2.5 A, or 3 A; determining, by the charging apparatus, that the power adapter supports a third charging mode; and then keeping, based on the third charging mode, the first switch element, the second switch element, the third switch element, and the fourth switch element open; in a first time period, closing the fifth switch element, and opening the sixth switch element, so that the second energy storage element is charged by using the input power supply; and in a second time period after the first time period, opening the fifth switch element, and closing the sixth switch element, so that the second energy storage element is discharged to charge the battery. In the method, the charging apparatus can output a steady charging current to the battery.

According to the first energy storage element and the second energy storage element in the foregoing aspects and implementations, for example, the first energy storage element is a capacitor, and the second energy storage element is an inductor; or the first energy storage element includes at least two capacitors that are connected in parallel, and the second energy storage element includes at least two inductors that are connected in series.

DESCRIPTION OF EMBODIMENTS

The following describes technical solutions of this application with reference to accompanying drawings.

Figure 1:
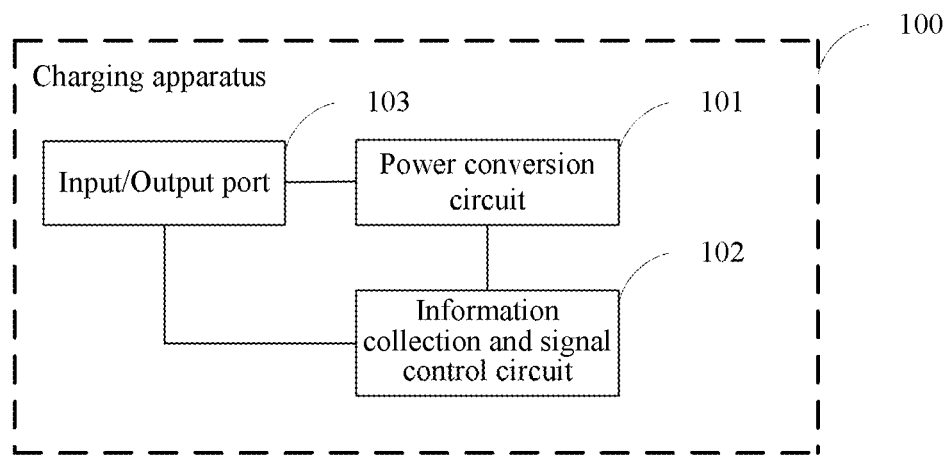
FIG. 1 is a schematic diagram of a charging apparatus according to an embodiment of the present invention.

FIG. 1 shows a charging apparatus 100 according to an embodiment of the present invention. The apparatus is configured to convert input power energy based on a preset mode and a charging current supported by a battery, and then provide energy for the battery. In FIG. 1, the charging apparatus 100 includes a power conversion circuit 101, an information collection and signal control circuit 102, and an input/output port 103.

Figure 2:
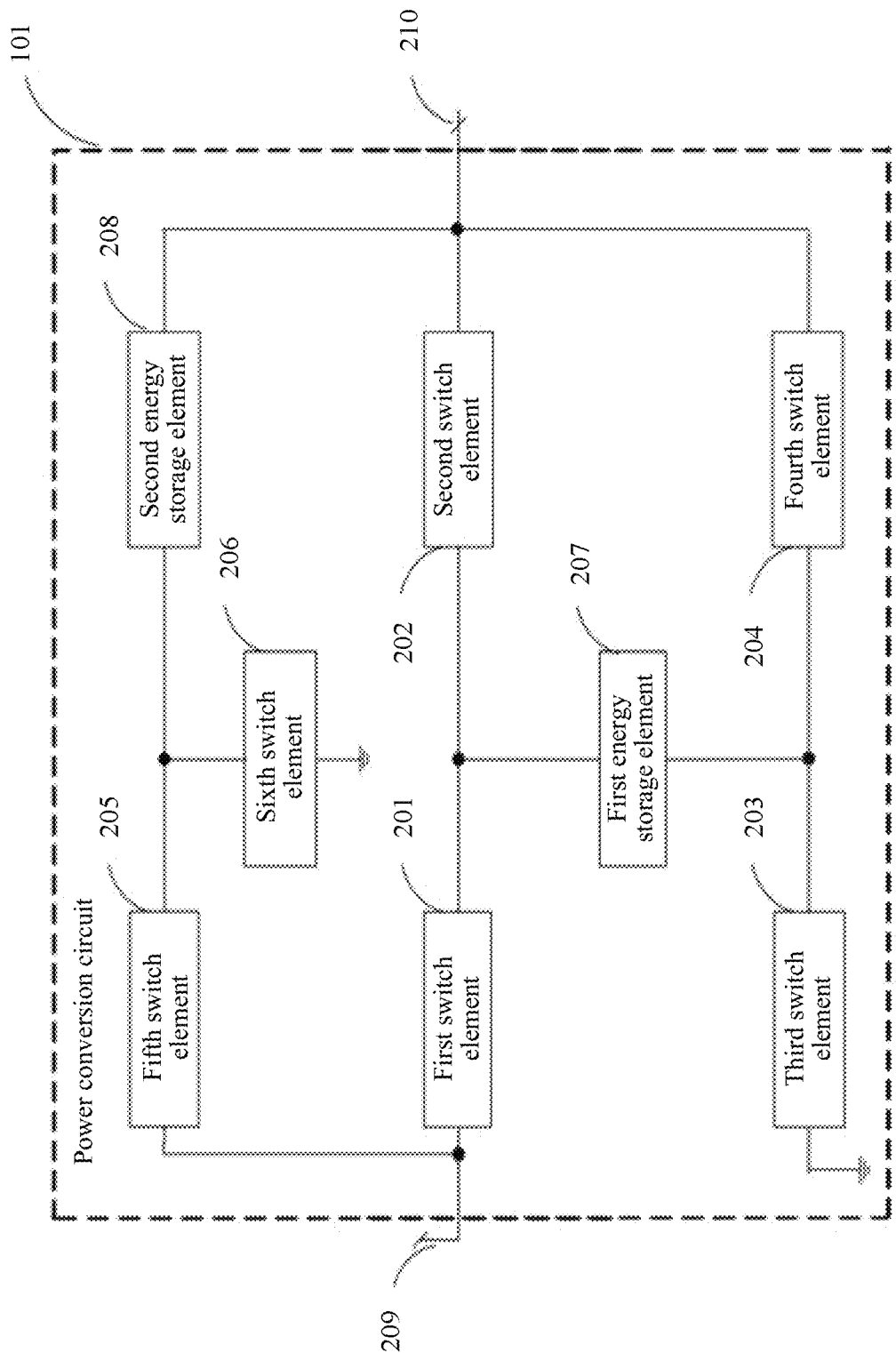
FIG. 2 is a schematic structural diagram of a power conversion circuit according to an embodiment of the present invention.

For the power conversion circuit 101 in the charging apparatus 100, FIG. 2 shows a structure of the power conversion circuit according to an embodiment of the present invention. In FIG. 2, the power conversion circuit 101 is configured to convert a power supply $V_{BUS}$ into a charging current required by a battery. The power conversion circuit 101 includes: a first switch element 201, a second switch element 202, a third switch element 203, a fourth switch element 204, a fifth switch element 205, a sixth switch element 206, a first energy storage element 207, and a second energy storage element 208.

In FIG. 2, a first end of the first switch element 201 is coupled and connected to the power supply $V_{BUS}$ through a first external connection end 209 of the power conversion circuit 101, a second end of the first switch element 201 is separately coupled to a first end of the first energy storage element 207 and a first end of the second switch element 202, a second end of the first energy storage element 207 is separately coupled to a first end of the third switch element 203 and a first end of the fourth switch element 204, a second end of the second switch element 202 is coupled and connected to a battery through a second external connection end 210 of the power conversion circuit 101, a second end of the fourth switch element is coupled to the second external connection end 210, a second end of the third switch element is grounded, a first end of the fifth switch element 205 is coupled to the first external connection end 209, a second end of the fifth switch element 205 is separately coupled to a first end of the second energy storage element 208 and a first end of the sixth switch element 206, a second end of the second energy storage element 208 is coupled to the second external connection end 210, and a second end of the sixth switch element 206 is grounded.

As shown in FIG. 2, the first switch element 201, the second switch element 202, the third switch element 203, the fourth switch element 204, and the first energy storage element 207 form a first sub-circuit in the power conversion circuit 101; the fifth switch element 205, the sixth switch element 206, and the second energy storage element 208 form a second sub-circuit in the power conversion circuit 101; and the first sub-circuit and the second sub-circuit are connected in parallel.

Optionally, the first energy storage element 207 and the second energy storage element 208 each may be one or more devices that can store energy and can release the stored energy. For example, the device may be a capacitor or an inductor. Optionally, the first energy storage element 207 and the second energy storage element 208 may have different device types. For example, the first energy storage element 207 is a capacitor, and the second energy storage element 208 is an inductor in one embodiment of the disclosure. For another example, the first energy storage element 207 includes at least two capacitors that are connected in parallel, and the second energy storage element 208 includes at least two inductors that are connected in series. A device type, a device quantity, and a device composition form that are included in an energy storage element are not limited in this embodiment of the present invention.

Optionally, at least one of the first switch element 201, the second switch element 202, the third switch element 203, the fourth switch element 204, the fifth switch element 205, and the sixth switch element 206 is a metal oxide semiconductor (MOS) field effect transistor or a bipolar junction transistor (bipolar junction transistor, BJT). This is not limited in this embodiment of the present invention.

Figure 3:
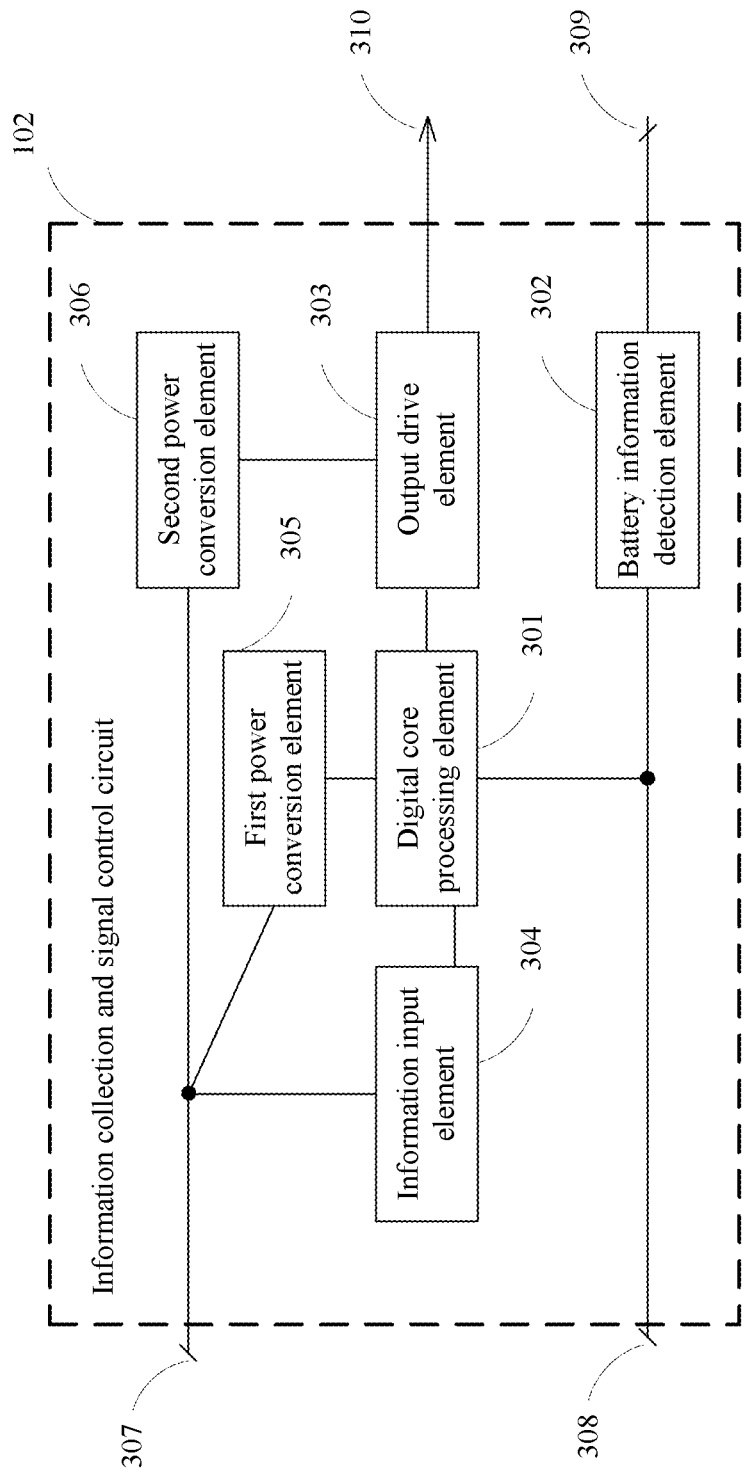
FIG. 3 is a schematic structural diagram of an information collection and signal control circuit according to an embodiment of the present invention.

For the information collection and signal control circuit 102 in the charging apparatus 100, FIG. 3 shows a structure of the information collection and signal control circuit according to an embodiment of the present invention. In FIG. 3, the information collection and signal control circuit 102 includes: a digital core processing element (which may also be expressed as a digital core) 301, a battery information detection element (which may also be expressed as a BAT info DET) 302, an output drive element (which may also be expressed as an output driver) 303, an information input element (which may also be expressed as an INPT info) 304, a first power conversion element (which may also be expressed as an LD) 305, and a second power conversion element (which may also be expressed as an LD) 306.

In FIG. 3, the information input element 304, the first power conversion element 305, and the second power conversion element 306 are separately coupled and connected to a power supply $V_{BUS}$ through a first external connection end 307 of the information collection and signal control circuit 102. The information input element 304 is connected to the digital core processing element 301. The information input element 304 is configured to collect an electrical characteristic of the power supply $V_{BUS}$. For example, the electrical characteristic may be voltage and/or current information. Then the information input element 304 transfers the collected electrical characteristic to the digital core processing element 301. The first power conversion element 305 is connected to the digital core processing element 301. The first power conversion element 305 is configured to convert a voltage of the power supply $V_{BUS}$ into a voltage $V_1$ required by the digital core processing element 301. The second power conversion element 306 is connected to the output drive element 303. The second power conversion element 306 is configured to convert a voltage of the power supply $V_{BUS}$ into a voltage $V_2$ required by the output drive element 303. The digital core processing element 301 is coupled and connected to a data line of a power adapter through a second external connection end 308 of the information collection and signal control circuit 102 and implements data communication by reading a D+/D− high/low level. For example, the communication is protocol-based handshaking between the power adapter and the charging apparatus. Through the communication, the digital core processing element obtains a voltage range of the power supply $V_{BUS}$ that is supported by the power adapter, or instructs the power adapter to adjust a voltage that is output to the power supply $V_{BUS}$ of the charging apparatus, so that the charging apparatus converts an adjusted voltage of the power supply $V_{BUS}$ into a charging current required by a battery. The digital core processing element 301 is further connected to the battery information detection element 302, and the battery information detection element 302 is coupled and connected to a battery through a third external connection end 309 of the information collection and signal control circuit 102. The battery information detection element 302 is configured to collect battery system information, for example, information about a voltage and a current that can be supported by the battery, or a battery retention capacity (retention capacity). Then the battery information detection element 302 transfers the collected battery system information to the digital core processing element 301. The digital core processing element 301 is further connected to the output drive element 303, for example, is connected through a gate control bus. The digital core processing unit 301 analyzes collected information, where the information includes the electrical characteristic of the power supply $V_{BUS}$, information about a voltage and a current supported by the power adapter, and the battery system information. The digital core processing unit 301 generates a time sequence signal according to a service requirement, and then transfers the time sequence signal to the output drive element 303. The service requirement is a charging mode set by the charging apparatus. Specifically, a current threshold is preset in the digital core processing unit 301. Using a current of 2 A as an example, if a charging current supported by the battery is greater than or equal to 2 A, the service requirement may be using a high-voltage direct-charge mode, or the service requirement may be using a low-voltage direct-charge mode; or if a charging current supported by the battery is less than 2 A, the service requirement may be using a buck circuit mode. The time sequence signal is used to control closing or opening of each switch element in the power conversion circuit 101, so that an energy storage element stores and releases energy based on different charging modes. The output drive element 303 is coupled to each switch element in the power conversion circuit 101 through a fourth external connection end 310 of the information collection and signal control circuit 102. The output drive element 303 is configured to convert a digital signal transferred by the digital core processing element 301 into an analog signal. Then each switch element in the power conversion circuit 101 is closed or opened based on the analog signal, so that the charging apparatus charges the battery according to the service requirement.

Optionally, the battery information detection element 302 and the information input element 304 may periodically collect information or may dynamically collect information according to a charging requirement. This is not limited in this embodiment of the present invention. Selection of the current threshold is determined based on a scope of knowledge of a person skilled in the art. Usually, a relatively large charging current value is selected, for example, 2 A or 2.5 A. The current threshold may be flexibly set by the digital core processing unit 301 based on a use status of the battery.

Figure 4:
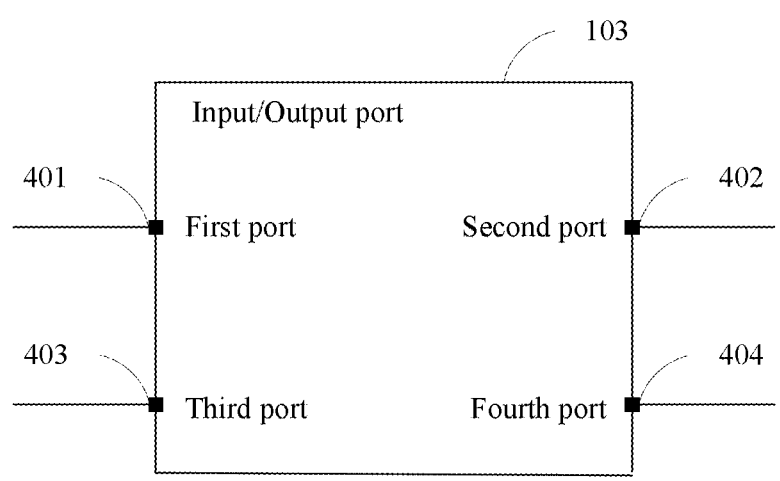
FIG. 4 is a schematic structural diagram of an input/output port according to an embodiment of the present invention.

For the input/output port 103 in the charging apparatus 100, FIG. 4 shows a structure of the input/output port according to an embodiment of the present invention. In FIG. 4, the input/output port 103 is a USB port (which may also be expressed as a USB port) and belongs to serial communications. Specifically, a first end 401 of the USB port is connected to a power supply $V_{BUS}$ of a power adapter, and a second end 402 of the USB port is separately coupled to a first external connection end 209 of the power conversion circuit 101 and a first external connection end 307 of the information collection and signal control circuit 102. The second end 402 transfers energy of the power supply $V_{BUS}$ to the power conversion circuit 101 and the information collection and signal control circuit 102. A third end 403 of the USB port is connected to a data line of the power adapter. A fourth end 404 of the USB port is coupled to a second external connection end 308 of the information collection and signal control circuit 102. The fourth end 404 transfers a high or low level to implement data reading and writing for the information collection and signal control circuit 102.

Figure 5:
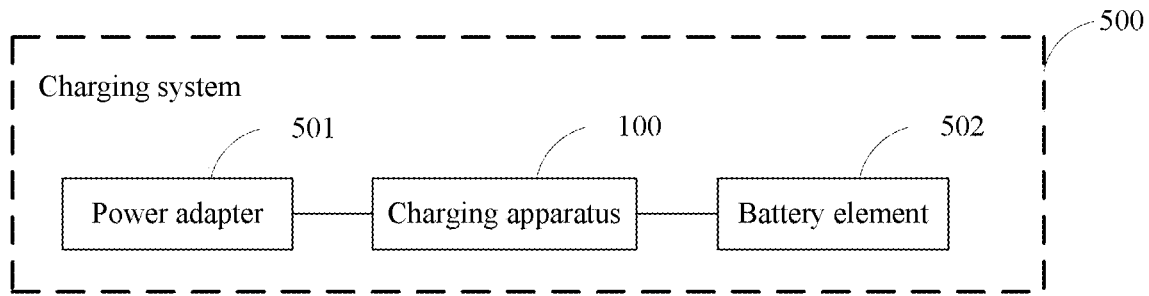
FIG. 5 is a schematic diagram of a charging system according to an embodiment of the present invention.

With reference to the descriptions of the charging apparatus in FIG. 1 to FIG. 4, FIG. 5 shows a charging system 500 according to an embodiment of the present invention. In FIG. 5, the charging system 500 includes: a charging apparatus 100, a power adapter 501, and a battery element 502. One end of the power adapter 501 is connected to an external power supply, and the other end of the power adapter 501 is connected to an input/output port 103 of the charging apparatus 100. The power adapter 501 is configured to convert the external power supply into a power supply $V_{BUS}$ required by the charging apparatus 100. Then energy of the power supply $V_{BUS}$ is output to the charging apparatus 100 through a power cable. Output types may be classified into an alternating-current output type and a direct-current output type. This is not limited in this embodiment of the present invention. The power adapter 501 is further configured to implement data communication and exchange with the charging apparatus 100 through a data line. The charging apparatus 100 may be an independent apparatus, or may be disposed inside a device, where the device may be a device such as a terminal, a base station, or an electric vehicle. The terminal may be a mobile phone (also referred to as a smartphone), a tablet computer, a personal digital assistant (PDA), an electronic book reader (e-book reader), a wearable device, or the like. The base station may include a macro base station, a micro base station (also referred to as a small cell), a relay station, an access point, or the like in various forms. The charging apparatus 100 is connected to the battery element 502 and is configured to charge a battery by using obtained energy. Optionally, the device may further include the battery element 502, and the battery element 502 may include one or more batteries. If the battery element 502 includes a plurality of batteries, the plurality of batteries may be connected in series or in parallel. This is not limited in this embodiment of the present invention.

It should be noted that some constituent parts included in the charging apparatus and the charging system in this application are expressed as "xx elements". This expression presents each constituent part from a perspective of a function, but does not limit an implementation form of the constituent part. For example, each constituent part may be implemented by a physical device, or a chip, or a circuit or an integrated circuit. This is not limited in this embodiment of the present invention.

The power conversion circuit in FIG. 2 includes at least six switch elements. A composition structure of the power conversion circuit enables the charging apparatus to select an appropriate charging mode based on the charging current supported by the battery, to charge the battery. Different charging modes supported by the power conversion circuit are described with reference to the foregoing descriptions of the charging apparatus.

Figure 6:
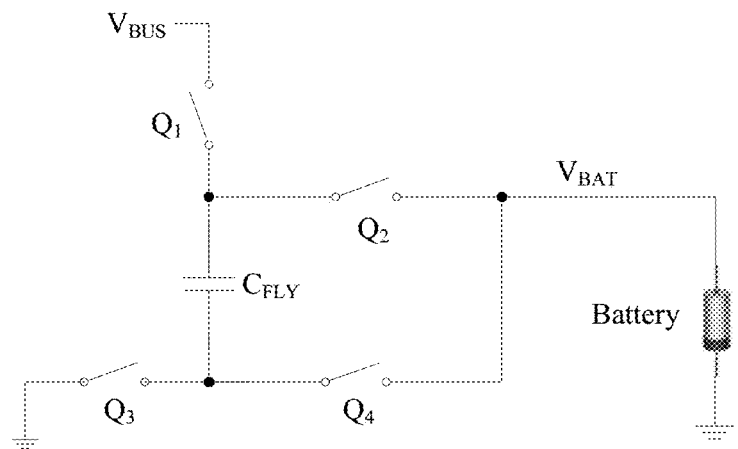
FIG. 6 is a schematic structural diagram of an effective operating circuit of a power conversion circuit based on a first charging mode according to an embodiment of the present invention.

First charging mode: The charging current supported by the battery is greater than or equal to the preset current threshold (for example, 2 A, 2.5 A, or 3 A), and the power conversion circuit is used to directly charge the battery at a high voltage. Based on this mode, with reference to FIG. 2, the fifth switch element and the sixth switch element in the power conversion circuit are always kept open, so that a second energy storage element is always in a non-operating state. For the "kept open", because an open switch element has very large impedance, from a perspective of an actual effect, this is similar to that the open switch element is not connected to other elements. In this case, in the first charging mode, the first sub-circuit including the first switch element, the second switch element, the third switch element, the fourth switch element, and the first energy storage element is actually used as an effective operating circuit structure of the power conversion circuit. Specifically, FIG. 6 shows the effective operating circuit structure of the power conversion circuit based on the first charging mode according to an embodiment of the present invention. In FIG. 6, the first switch element is denoted as $Q_1$, the second switch element is denoted as $Q_2$, the third switch element is denoted as $Q_3$, the fourth switch element is denoted as $Q_4$, and the first energy storage element is a capacitor $C_{FLY}$. In the power conversion circuit, a first end of the capacitor $C_{FLY}$ is connected to a power supply $V_{BUS}$ through the switch element $Q_1$, the first end of the capacitor $C_{FLY}$ is further coupled and connected to a positive end of a battery element (a battery shown in FIG. 6) through the switch element $Q_2$, a second end of the capacitor $C_{FLY}$ is grounded through the switch element $Q_3$, the second end of the capacitor $C_{FLY}$ is further coupled and connected to the positive end of the battery element through the switch element $Q_4$, and a negative end of the battery element is grounded.

Figure 7:
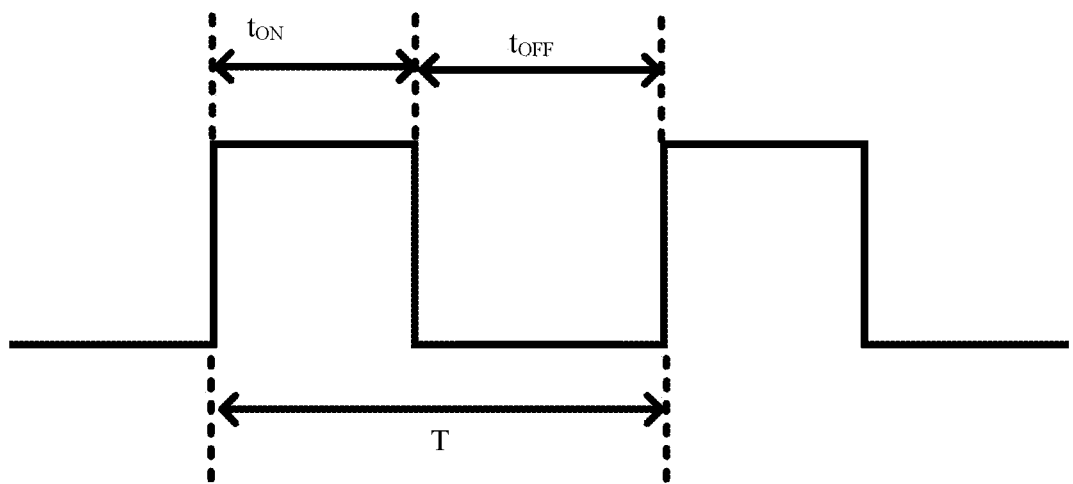
FIG. 7 is a schematic diagram of a control signal time sequence of a power conversion circuit according to an embodiment of the present invention.

With reference to FIG. 7, in the first time period $t_{ON}$, the switch element $Q_1$ and the switch element $Q_4$ are in a closed state, the switch element $Q_2$ and the switch element $Q_3$ are in an open state, and the input power supply $V_{BUS}$ is connected to the capacitor $C_{FLY}$ and then connected to a battery $V_{BAT}$. In this case, the capacitor $C_{FLY}$ is in a charging and energy storage state. In the second time period $t_{OFF}$ after the first time period $t_{ON}$, the switch element $Q_1$ and the switch element $Q_4$ are in an open state, the switch element $Q_2$ and the switch element $Q_3$ are in a closed state, a lower plate of the capacitor $C_{FLY}$ is grounded, and an upper plate of the capacitor $C_{FLY}$ is connected to the battery $V_{BAT}$. In this case, the capacitor $C_{FLY}$ is in a discharging state, and charges the battery element.

The first charging mode is usually applicable to a case in which a power adapter supports a relatively high power voltage (for example, 9 V, 12 V, or 20 V), and a battery supports a relatively large charging current (for example, 2 A, 2.5 A, or 3 A). The charging apparatus charges the battery in the first charging mode by using the power conversion circuit. In the first time period $t_{ON}$, two ends of the capacitor $C_{FLY}$ are separately directly connected to the power supply $V_{BUS}$ and the battery $V_{BAT}$; and in the second time period $t_{OFF}$, a charging voltage of the battery is a difference between voltages at two ends of the capacitor $C_{FLY}$. Because the input power supply $V_{BUS}$ directly charges the capacitor $C_{FLY}$, charging efficiency of the capacitor is relatively high, and energy input to the battery directly sources from charging energy of the capacitor, so that a voltage of the input power supply approaches twice a voltage of the battery. In this high-voltage direct-charge case, an energy loss of the capacitor $C_{FLY}$ is relatively low, the charging current is relatively large, and the battery is likely to be fully charged with electricity fast, thereby effectively increasing a battery charging rate.

Second charging mode: The charging current supported by the battery is greater than or equal to the first current threshold (for example, 2 A, 2.5 A, or 3 A) and less than the second current threshold (for example, 5 A), and the power conversion circuit is used to directly charge the battery at a low voltage. Based on this mode, with reference to FIG. 2, the fourth switch element, the fifth switch element, and the sixth switch element in the power conversion circuit are always kept open, so that the second energy storage element is always in a non-operating state. In addition, the first switch element and the third switch element are always kept closed, so that the first energy storage element is always in a non-operating state. In this case, in the power conversion circuit, one end of the second switch element is coupled and connected to a power supply $V_{BUS}$, the other end of the second switch element is coupled and connected to a positive end of a battery, and a negative end of a battery element is grounded.

With reference to FIG. 7, in the first time period $t_{ON}$, the second switch element is in a closed state, and the input power supply $V_{BUS}$ is connected to a battery $V_{BAT}$. In this case, the battery element is directly charged. In the second time period $t_{OFF}$, the second switch element is in an open state, and charging of the battery element is suspended.

First, a difference between the second charging mode and the first charging mode lies in different requirements for the charging current supported by the battery. In the second charging mode, because of low-voltage direct-charge, a value of a current input to the charging apparatus approaches a charging current output to the battery. However, a maximum value of a current supported by a cable connecting the power adapter to the charging apparatus is usually 5 A. If a current passing through the cable is greater than 5 A, the cable is damaged, or a cable with relatively high costs needs to be used to transmit the current. Therefore, the charging current of the battery cannot be greater than 5 A. In the first charging mode, because of high-voltage direct-charge, a value of a voltage input to the charging apparatus approaches twice of a voltage of the battery, but a value of a charging current of the battery approaches twice a current input to the charging apparatus. Further, with reference to the foregoing current thresholds, using currents of 2 A and 5 A as examples, in the second charging mode, the charging current (denoted as $I_{BAT}$) of the battery needs to range from 2 A to 5 A, namely, $2\ A \leq I_{BAT} \leq 5\ A$; and in the first charging mode, the charging current of the battery needs to be greater than or equal to 2 A, namely, $2\ A \leq I_{BAT}$.

Next, a difference between the second charging mode and the first charging mode lies in different requirements for the power voltage supported by the power adapter. In the second charging mode, the power adapter needs to provide a relatively low voltage and a relatively large current for the charging apparatus. In the first charging mode, the power adapter needs to provide a relatively high voltage and a relatively large current for the charging apparatus.

In the second charging mode, the charging apparatus directly charges the battery with power energy through closing and opening of the second switch element in the power conversion circuit. Therefore, circuit impedance is relatively small, and an energy loss is relatively low. In addition, a voltage of the power supply $V_{BUS}$ approaches a voltage of the battery $V_{BAT}$. Apparently, the charging apparatus implements charging at a low voltage, but the charging voltage is relatively large. Therefore, an overall energy loss is relatively low when the charging apparatus charges the battery, and the battery is likely to be fully charged with electricity fast, thereby effectively increasing a battery charging rate.

Figure 8:
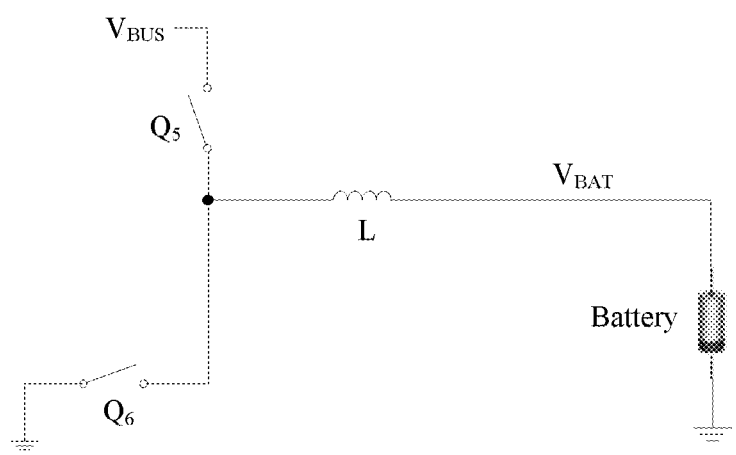
FIG. 8 is a schematic structural diagram of an effective operating circuit of a power conversion circuit based on a third charging mode according to an embodiment of the present invention.

Third charging mode: The charging current supported by the battery is greater than or equal to the current threshold (for example, 2 A), and the power conversion circuit is used to charge the battery in a buck circuit mode. Based on this mode, with reference to FIG. 2, the first switch element, the second switch element, the third switch element, and the fourth switch element in the power conversion circuit are always kept open, so that the first energy storage element is always in a non-operating state. In this case, in the third charging mode, the second sub-circuit including the fifth switch element, the sixth switch element, and the second energy storage element is actually used as an effective operating circuit structure of the power conversion circuit. The circuit is similar to a typical buck circuit. Specifically, FIG. 8 shows the effective operating circuit structure of the power conversion circuit based on the third charging mode according to an embodiment of the present invention. In FIG. 8, the fifth switch element is denoted as $Q_5$, the sixth switch element is denoted as $Q_6$, and the second energy storage element is an inductor L. In the power conversion circuit, a first end of the inductor L is connected to a power supply $V_{BUS}$ through the switch element $Q_6$, the first end of the inductor L is further grounded through the switch element $Q_6$, a second end of the inductor L is coupled and connected to a positive end of a battery element (a battery shown in FIG. 8), and a negative end of the battery element is grounded.

With reference to FIG. 7, in the first time period $t_{ON}$, the switch element $Q_5$ is in a closed state, the switch element $Q_6$ is in an open state, and the input power supply $V_{BUS}$ is connected to the inductor L and then connected to a battery $V_{BAT}$. In this case, the inductor L is in a charging and energy storage state. In the second time period $t_{OFF}$, the switch element $Q_5$ is in an open state, the switch element $Q_6$ is in a closed state, and the inductor L is in a discharging state, and charges the battery element.

The third charging mode is usually applicable to a case in which a charging current of a battery is relatively small, for example, $I_{BAT}$<2 A. In addition, a requirement for a power adapter in this mode is lower than that for a power adapter in the foregoing two modes. Because of small-current charging, compared with the foregoing charging modes, the third charging mode better enables the charging apparatus to output a steady charging current to the battery. Optionally, the second end of the second energy storage element is further connected to a first end of another energy storage element (for example, a capacitor), and a second end of the another energy storage element is grounded, so that a charging current output to the battery is steadier.

For a switch element in the power conversion circuit described in the foregoing embodiments, optionally, magnitude of a gate voltage of the switch element may be changed to close or open the switch element. For example, the first end of the switch element $Q_1$ is coupled and connected to the power supply $V_{BUS}$, and the second end of the switch element $Q_1$ is connected to another element. When the charging apparatus determines that the switch element $Q_1$ needs to be closed, a gate voltage of the switch element $Q_1$ is increased, so that the gate voltage is higher than a voltage at the second end of the switch element $Q_1$. In this case, the switch element $Q_1$ is in a low-resistance conducting state. When the charging apparatus determines that the switch element $Q_1$ needs to be opened, the gate voltage of the switch element $Q_1$ is decreased, so that the gate voltage is lower than the voltage at the second end of the switch element $Q_1$. In this case, the switch element $Q_1$ is in a high-resistance cut-off state. Because types of switch elements are different, correspondingly, implementations of closing or opening the switch elements are different. This is not limited in this embodiment of the present invention.

With reference to the foregoing descriptions, the following describes a specific process of charging the battery by the charging system.

The input/output port 103 of the charging apparatus 100 is connected to the power adapter 501 to obtain the input power supply $V_{BUS}$, and then separately provides power energy for the power conversion circuit 101 and the information collection and signal control circuit 102. The digital core processing element 301 in the charging apparatus 100 performs protocol-based communication with the power adapter 501 through the input/output port 103; and then determines, based on a charging mode supported by the power adapter 501, a charging current required by the battery element 502, and a preset current threshold, a charging mode used by the power conversion circuit 101. One current threshold or two current thresholds (an upper current limit and a lower current limit) may be preset in the digital core processing element. A priority sequence of different charging modes may also be preset and flexibly adjusted based on a use status of the battery. The following provides description by using several examples. This is not limited in this embodiment of the present invention.

For example, in the charging apparatus 100, the digital core processing element 301 determines, based on the battery system information collected by the battery information detection element 302, that the charging current required by the battery is 6 A. If a current threshold is preset to 2 A, the digital core processing element 301 determines that 6 A is greater than 2 A; determines, based on the protocol-based communication with the power adapter 501, that the power adapter 501 supports the first charging mode; and then sets a status of the charging apparatus to the first charging mode.

For another example, in the charging apparatus 100, the digital core processing element 301 determines, based on the battery system information collected by the battery information detection element 302, that the charging current required by the battery is 3 A. If a first current threshold (also referred to as a lower current limit) is preset to 2 A and a second current threshold (also referred to as an upper current limit) is preset to 5 A, the digital core processing element 301 determines that 3 A is between 2 A and 5 A; determines, based on the protocol-based communication with the power adapter 501, that the power adapter 501 supports the second charging mode; and then sets a status of the charging apparatus to the second charging mode.

For another example, in the charging apparatus 100, the digital core processing element 301 determines, based on the battery system information collected by the battery information detection element 302, that the charging current required by the battery is 4 A. If a current threshold is preset to 2 A, the digital core processing element 301 determines that 4 A is greater than 2 A. The digital core processing element 301 first determines, based on the protocol-based communication with the power adapter 501, whether the power adapter 501 supports the first charging mode, where a determining result is that the power adapter 501 does not support the first charging mode; then determines whether the power adapter 501 supports the second charging mode, where a determining result is that the power adapter 501 supports the second charging mode; and then sets a status of the charging apparatus to the second charging mode.

For another example, in the charging apparatus 100, the digital core processing element 301 determines, based on the battery system information collected by the battery information detection element 302, that the charging current required by the battery is 4 A. If a first current threshold (also referred to as a lower current limit) is preset to 2 A and a second current threshold (also referred to as an upper current limit) is preset to 5 A, the digital core processing element 301 determines that 4 A is between 2 A and 5 A; first determines, based on the protocol-based communication with the power adapter 501, whether the power adapter 501 supports the second charging mode, where a determining result is that the power adapter 501 does not support the second charging mode; then determines whether the power adapter 501 supports the first charging mode, and determines that the power adapter 501 supports the first charging mode; and then sets a status of the charging apparatus to the first charging mode.

For another example, in the charging apparatus 100, the digital core processing element 301 determines, based on the battery system information collected by the battery information detection element 302, that the charging current required by the battery is 1 A. If a current threshold is preset to 2 A, the digital core processing element 301 determines that 1 A is less than 2 A; determines, based on the protocol-based communication with the power adapter 501, that the power adapter 501 supports the third charging mode; and then sets a status of the charging apparatus to the third charging mode.

In the charging apparatus 100, the digital core processing element 301 performs protocol-based communication with the power adapter 501 through the input/output port 103; and drives, based on a determined charging mode, the power adapter 501 to adjust a power voltage and current input to the charging apparatus 100. The digital core processing element 301 drives closing or opening of each switch element in the power conversion circuit 101 through the output drive element 303 based on the determined charging mode, so that the charging apparatus 100 charges the battery element 502. Optionally, the battery information detection element 302 detects that the battery element 502 is fully charged and then notifies the digital core processing element 301. The digital core processing element 301 performs protocol-based communication with the power adapter 501 through the input/output port 103; drives the power adapter 501 to adjust, to 5 V, a voltage input to the charging apparatus 100; and then drives, through the output drive element 303, the power conversion circuit 101 to exit the used charging mode. Because the input/output port 103 is usually a USB port, a standard voltage of the input/output port 103 is 5 V by default.

Based on the descriptions in the foregoing embodiments, a circuit structure of the charging apparatus can support a plurality of different charging modes, so that the battery can be charged more quickly, thereby effectively improving charging efficiency.

In the specification and claims of this application, the terms "first", "second", "third", "fourth", and so on are intended to distinguish between different objects but do not indicate a particular order.

It should be understood that in the embodiments of the present invention, same elements correspond to similar signs in the accompanying drawings. In addition, the foregoing descriptions of the embodiments in the present invention emphasize differences between the embodiments. For same or similar parts that are not mentioned, refer to the embodiments. For brevity, details are not described herein again.

It should be further understood that in this specification, that A is connected to B may indicate that A is directly connected to B, or A is indirectly connected to B. For example, A is connected to B through one or more elements. This is not limited in the embodiments of the present invention.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that the digital core processing element and the method steps described with reference to the embodiments disclosed in this specification may be implemented by electronic hardware, or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present invention.

In the several embodiments provided in this application, it should be understood that the disclosed system, apparatus, and method may be implemented in other manners. For example, the element division is merely logical function division, and there may be other division manners in actual implementation. For example, a plurality of elements may be combined or integrated into another system, or some features may be ignored or not performed. In addition, the shown or discussed mutual couplings or communication connections may be implemented by using some interfaces. The indirect couplings or communication connections between the apparatuses or units may be implemented in electrical, mechanical, or other forms.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A charging apparatus, comprising a power conversion circuit, the power conversion circuit comprising: a first switch element, a second switch element, a third switch element, a fourth switch element, a fifth switch element, a sixth switch element, a first energy storage element, and a second energy storage element, wherein
   a first end of the first switch element is coupled and connected to an input power supply through a first external connection end of the power conversion circuit, a second end of the first switch element is separately coupled to a first end of the first energy storage element and a first end of the second switch element, a second end of the first energy storage element is separately coupled to a first end of the third switch element and a first end of the fourth switch element, a second end of the second switch element is coupled to a second external connection end of the power conversion circuit, a second end of the fourth switch element is coupled to the second external connection end, a second end of the third switch element is grounded, a first end of the fifth switch element is coupled to the first external connection end, a second end of the fifth switch element is separately coupled to a first end of the second energy storage element and a first end of the sixth switch element, a second end of the second energy storage element is coupled to the second external connection end, and a second end of the sixth switch element is grounded.

2. The charging apparatus according to claim 1, further comprising an input/output port, and an information collection and signal control circuit coupled to the power conversion circuit, wherein the information collection and signal control circuit is coupled and connected to the input/output port.

3. The charging apparatus according to claim 2, wherein the information collection and signal control circuit comprises: a digital core processing element, a battery information detection element, an output drive element, an information input element, a first power conversion element, and a second power conversion element, wherein the information input element, the first power conversion element, and the second power conversion element are separately coupled and connected to the input power supply through a first external connection end of the information collection and signal control circuit; the information input element is connected to the digital core processing element; the first power conversion element is connected to the digital core processing element; the second power conversion element is connected to the output drive element; the digital core processing element is coupled and connected to a data line of a power adapter through a second connection end of the information collection and signal control circuit; the digital core processing element is connected to the battery information detection element; the battery information detection element is coupled and connected to a battery through a third external connection end of the information collection and signal control circuit; the digital core processing element is connected to the output drive element; and the output drive element is separately coupled to each switch element in the power conversion circuit through a fourth external connection end of the information collection and signal control circuit.

4. The charging apparatus according to claim 2, wherein a first end of the input/output port is connected to the input power supply of the power adapter, a second end of the input/output port is separately coupled to the first external connection end of the power conversion circuit and the first external connection end of the information collection and signal control circuit, a third end of the input/output port is connected to the data line of the power adapter, and a fourth end of the input/output port is coupled to the second external connection end of the information collection and signal control circuit.

5. The charging apparatus according to claim 2, wherein the input/output port is a USB port.

6. The charging apparatus according to claim 2, wherein the charging apparatus further comprises a control logic, configured to perform at least one of the following operations:

based on a first charging mode, keeping the fifth switch element and the sixth switch element open, wherein in a first time period, the first switch element and the fourth switch element are in a closed state, the second switch element and the third switch element are in an open state, and the first energy storage element is charged; and in a second time period after the first time period, the first switch element and the fourth switch element are in an open state, the second switch element and the third switch element are in a closed state, and the first energy storage element is discharged;

based on a second charging mode, keeping the fourth switch element, the fifth switch element, and the sixth switch element open, and keeping the first switch element and the third switch element closed, wherein in a first time period, the second switch element is in a closed state; and in a second time period after the first time period, the second switch element is in an open state; and based on a third charging mode, keeping the first switch element, the second switch element, the third switch element, and the fourth switch element open, wherein in a first time period, the fifth switch element is in a closed state, the sixth switch element is in an open state, and the second energy storage element is charged; and in a second time period after the first time period, the fifth switch element is in an open state, the sixth switch element is in a closed state, and the first energy storage element is discharged.

7. The charging apparatus according to claim 2, wherein the charging apparatus further comprises a control logic, configured to perform the following operations:

obtaining, by the charging apparatus, an input power supply through a connection to a power adapter;

collecting, by the charging apparatus through a connection to a battery, a charging current value supported by the battery, wherein the charging current value is greater than or equal to a preset current threshold;

determining, by the charging apparatus, that the power adapter supports a first charging mode; and keeping, by the charging apparatus based on the first charging mode, the fifth switch element and the sixth switch element open; in a first time period, closing the first switch element and the fourth switch element, and opening the second switch element and the third switch element, so that the first energy storage element is charged by using the input power supply; and in a second time period after the first time period, opening the first switch element and the fourth switch element, and closing the second switch element and the third switch element, so that the first energy storage element is discharged to charge the battery.

8. The charging apparatus according to claim 2, wherein the charging apparatus further comprises a control logic, configured to perform the following operations:

obtaining, by the charging apparatus, an input power supply through a connection to a power adapter;

collecting, by the charging apparatus through a connection to a battery, a charging current value supported by the battery, wherein the charging current value is not less than a preset first current threshold and not greater than a preset second current threshold, and the first current threshold is less than the second current threshold;

determining, by the charging apparatus, that the power adapter supports a second charging mode; and keeping, by the charging apparatus based on the second charging mode, the fourth switch element, the fifth switch element, and the sixth switch element open, and keeping the first switch element and the third switch element closed; in a first time period, closing the second switch element, so that the battery is directly charged by using the input power supply; and in a second time period after the first time period, opening the second switch element, to suspend charging of the battery.

9. The charging apparatus according to claim 2, wherein the charging apparatus further comprises a control logic, configured to perform the following operations:

obtaining, by the charging apparatus, an input power supply through a connection to a power adapter;

collecting, by the charging apparatus through a connection to a battery, a charging current value supported by the battery, wherein the charging current value is less than a preset current threshold;

determining, by the charging apparatus, that the power adapter supports a third charging mode; and keeping, by the charging apparatus based on the third charging mode, the first switch element, the second switch element, the third switch element, and the fourth switch element open; in a first time period, closing the fifth switch element, and opening the sixth switch element, so that the second energy storage element is charged by using the input power supply; and in a second time period after the first time period, opening the fifth switch element, and closing the sixth switch element, so that the second energy storage element is discharged to charge the battery.

* * * * *